US007638183B2

(12) United States Patent
Kim

(10) Patent No.: US 7,638,183 B2
(45) Date of Patent: Dec. 29, 2009

(54) SEMICONDUCTOR BELT AND ELECTROPHOTOGRAPHIC IMAGING APPARATUS

(75) Inventor: In Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 336 days.

(21) Appl. No.: 11/449,760

(22) Filed: Jun. 9, 2006

(65) Prior Publication Data

US 2007/0009817 A1 Jan. 11, 2007

(30) Foreign Application Priority Data

Jun. 10, 2005 (KR) ...................... 10-2005-0049695

(51) Int. Cl.
*B32B 7/02* (2006.01)
*C09K 19/00* (2006.01)
*C09K 19/52* (2006.01)

(52) U.S. Cl. ......................... 428/212; 428/213; 430/20; 430/56; 252/299.01

(58) Field of Classification Search ................. 428/212, 428/213; 430/56, 20; 252/299.01
See application file for complete search history.

(56) References Cited

U.S. PATENT DOCUMENTS

| | | | | |
|---|---|---|---|---|
| 5,021,036 | A * | 6/1991 | Tanaka et al. | 474/237 |
| 6,603,945 | B2 * | 8/2003 | Amarakoon et al. | 399/309 |
| 7,144,525 | B2 * | 12/2006 | Yoshikawa et al. | 252/500 |

FOREIGN PATENT DOCUMENTS

| | | |
|---|---|---|
| JP | 2000-137389 | 5/2000 |
| JP | 2000-155477 | 6/2000 |
| JP | 2001-18284 | 1/2001 |
| JP | 2001-34083 | 2/2001 |
| JP | 2004-34311 | 2/2004 |
| JP | 2004-177601 | 6/2004 |

* cited by examiner

*Primary Examiner*—David R Sample
*Assistant Examiner*—Lawrence D Ferguson
(74) *Attorney, Agent, or Firm*—Roylance, Abrams, Berdo & Goodman, L.L.P.

(57) ABSTRACT

A semiconductive belt for an electrophotographic imaging apparatus contains a side-chain liquid crystalline polymer and a liquid conductive polymer. A method of manufacturing the semiconductive belt pelletizes a mixture of a side-chain liquid crystalline polymer and a liquid conductive polymer and extrudes the mixture through a double bubble tubular injection molding apparatus. An electrophotographic imaging apparatus is provided including the semiconductive belt.

14 Claims, 2 Drawing Sheets

SEMICONDUCTOR BELT AND ELECTROPHOTOGRAPHIC IMAGING APPARATUS

CROSS-REFERENCE TO RELATED PATENT APPLICATION

This application claims the benefit of Korean Patent Application No. 10-2005-0049695, filed on Jun. 10, 2005, in the Korean Intellectual Property Office, the disclosure of which is incorporated herein by reference in its entirety.

BACKGROUND OF THE INVENTION

1. Field of the Invention

The present invention relates to a semiconductive belt, a method of manufacturing the semiconductive belt, and an electrophotographic imaging apparatus including the semiconductive belt. More particularly, the invention relates to a semiconductive belt including a side-chain liquid crystalline polymer and a liquid conductive polymer, a method of manufacturing, and an electrophotographic imaging apparatus including the semiconductive belt.

2. Description of the Related Art

In general, an electrophotographic imaging apparatus includes components, such as a photoconductor, a developer roller, a toner supply roller, a toner layer regulating unit, a charging unit, a cleaning blade, a laser scanning unit, etc. The developer roller is disposed between the toner supply roller and the photoconductor. In general, toner is transferred from the toner supply roller to the developer roller. The toner is uniformly distributed on the developer roller by the toner layer regulating unit installed on the developer roller and the toner is charged via friction.

FIG. 1 is a schematic view of a conventional electrophotographic imaging apparatus. The operation of the conventional electrophotographic imaging apparatus will be described below.

A charging unit 16 charges a photoconductor 11, and an electrostatic latent image is formed on the photoconductor 11 by a laser scanning unit (LSU) 19 radiating a laser beam on the photoconductor 11. A toner supply roller 13 supplies toner 14 to a developer roller 12. As the toner 14 passes through a toner layer regulating unit 15, the toner 14 is formed into a thin layer with a uniform thickness and is charged by high friction. Next, the thin layer of the toner 14 is developed by the electrostatic latent image formed on the photoconductor 11 into a toner image. A transfer roller (not shown) transfers the developed toner image to a paper, and a fuser (not shown) fuses the transferred toner image on the paper. Also, a cleaning blade 17 cleans residual toner 18 remaining after being transferred to the photoconductor 11.

In particular, an intermediate transfer belt (ITB) is used to transfer the developed toner image from the photoconductor 11 to paper, which is a final medium to which the developed toner image is transferred. FIG. 2 is a cross-sectional view of a conventional intermediate transfer belt unit including an ITB.

The ITB receives toner electrostatically and repeatedly transferred from a latent image on the photoconductor drum so that a superimposed toner image of a desired color is formed thereon, and transfers the toner image to paper.

The conventional ITB can have seams or no seams and is formed of polycarbonate, polyimide, ethylene/tetrafluoroethylene, etc.

In general, a seamless ITB is preferred than an ITB having seams. When an ITB has seams, additional devices, for example, are required for detecting the locations of seams and controlling the position of an image. Hence, a printing system often becomes complicated and thus, the manufacturing costs thereof increase. Also, because of the seams, a cleaning blade is more likely to be worn out and damaged, which leads to reduced cleaning ability, damage to the photoconductor, and shortened lifespan.

However, there is a limit to the manufacture of seamless ITBs on a large scale since a manufacturing process thereof involve discontinuous processes including injecting a source solution and additives into a mold using a centrifugal molding method and heating and rotating the mold at a high speed for a duration of time. To overcome this limitation, the number of molds can be increased. However, if the size of a final product is changed, the mold itself has to be reformed. When using single blow molding, which is widely used to manufacture a seamless ITB, additives may not be sufficiently dispersed, and the mechanical strength of the ITB is small.

To obtain an ITB with heat resistance, abrasion resistance, and fatigue resistance, polyimide or ethylene/tetrafluoroethylene is preferred over a polycarbonate as a material for the ITB. However, polyimide and ethylene/tetrafluoroethylene are expensive. In addition, when a conductive material, such as carbon black, etc., is added to obtain electrical conductivity, the conductive material is not easily dispersed in a belt, the resistance of the belt is non-uniform, and the surface of the belt is rough.

SUMMARY OF THE INVENTION

The present invention provides a semiconductive belt with improved mechanical strength and uniform electrical conductivity by being manufactured through a continuous double bubble tubular film process that allows easy dispersion of a conductive additive. The semiconductive belt is manufactured using a side-chain liquid crystalline polymer and a liquid conductive polymer and thus is cheap, and has a uniform resistance, a smooth surface, and a low hardness due to the characteristics of the side-chain liquid crystalline polymer and the liquid conductive polymer.

The present invention also provides a method of manufacturing the above-described semiconductive belt and an electrophotographic imaging apparatus using the semiconductive belt.

According to an aspect of the present invention, there is provided a semiconductive belt comprising: a side-chain liquid crystalline polymer; and a liquid conductive polymer.

According to another aspect of the present invention, there is provided a method of manufacturing a semiconductive belt, the method comprising: mixing a side-chain liquid crystalline polymer and a liquid conductive polymer in a nitrogen atmosphere to obtain a mixture; mixing and pelletizing the mixture in an extruder to obtain pellets; drying the pellets; and injecting the dried pellets into a double bubble tubular injection molding apparatus to obtain the semiconductive belt.

According to another aspect of the present invention, there is provided an electrophotographic imaging apparatus comprising the above-described semiconductive belt.

These and other aspects of the invention will become apparent from the following detailed description of the invention which in conjunction with the annexed drawing disclose one embodiment of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
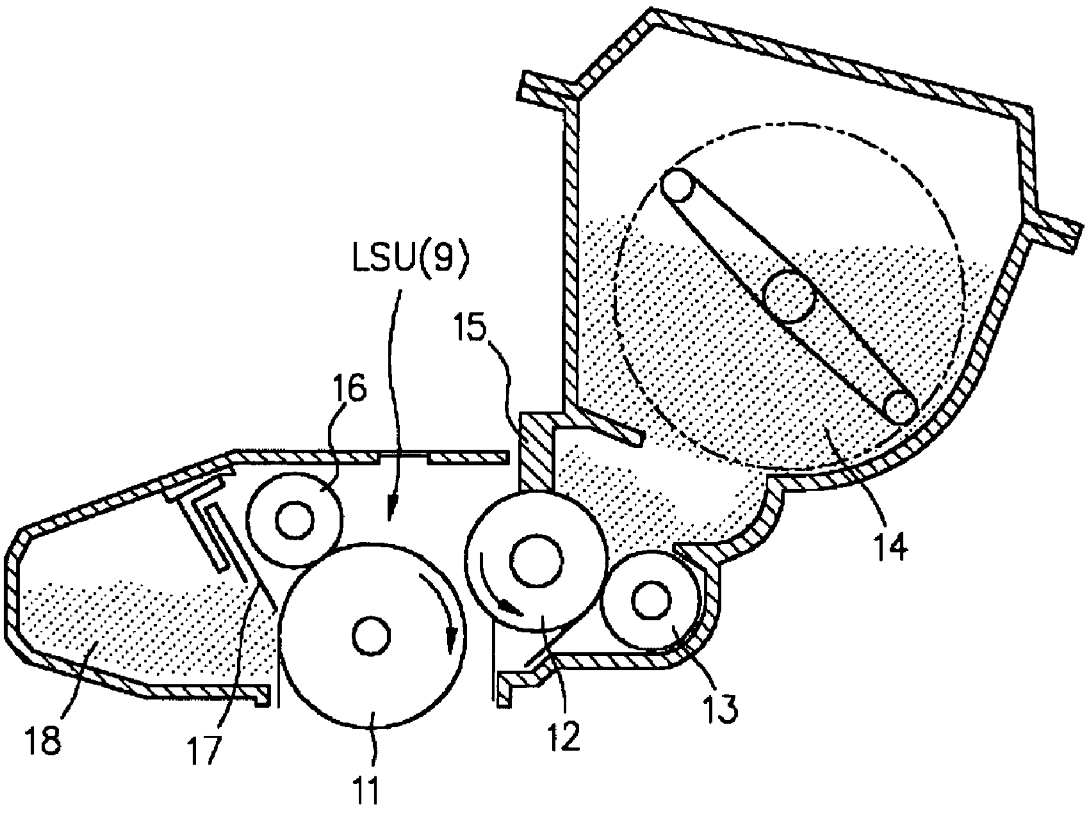
FIG. 1 (PRIOR ART)
FIG. 1 is a schematic view of a conventional electrophotographic imaging apparatus.

The present invention will be described more fully hereinafter with reference to the accompanying drawings.

The present invention provides a semiconductive belt including a side-chain liquid crystalline polymer and a liquid conductive polymer, a method of manufacturing, and an electrophotographic imaging apparatus including the semiconductive belt. In particular, the present invention provides a semiconductive belt with improved mechanical strength and uniform electrical conductivity by being manufactured through a continuous double bubble tubular film process that allows easy dispersion of a conductive agent. The invention also relates to a method of manufacturing the semiconductive belt, and an electrophotographic imaging apparatus using the semiconductive belt. Since the semiconductive belt is manufactured using a side-chain liquid crystalline polymer and a liquid conductive polymer, the cost of the semiconductive belt is low. The semiconductive belt has a uniform resistance, a smooth surface, and a low hardness due to the characteristics of the side-chain liquid crystalline polymer and the liquid conductive polymer.

The semiconductive belt according to the present invention includes a side-chain liquid crystalline polymer and a liquid conductive polymer. The term side-chain liquid crystal as known in the art refers to a polymer chain having a pendant side chain formed from a liquid crystal polymer.

Unlike currently commercially available films, the side-chain liquid crystalline polymer provides liquid crystalline characteristics and can implement a low resistance if required. In addition, the problems of the prior methods can be solved such as migration of the conductive material over time, an inferior image transfer, and image contamination arising when a conductive material, such as carbon black, etc., is used to control resistance. In addition, the side-chain liquid crystalline polymer is inexpensive and can provide as good mechanical properties and thermal resistance as can be obtained using polyimide, which is conventionally used, and greater fatigue resistance than nylon, polycarbonate, etc., and has a lower failure rate when a semiconductive belt manufactured using the method of the invention is incorporated into an ITU.

Examples of the side-chain liquid crystalline polymer that can be used in the present invention include a thermoplastic polyurethane polymer, a polystyrene polymer, a polyamide polymer, a methacrylate polymer, a siloxane polymer, and mixtures thereof, but the polymers are not limited thereto.

In particular, since the thermoplastic polyurethane polymer has excellent elasticity and can improve a scratch characteristic, the thermoplastic polyurethane polymer may be used as the side-chain liquid crystalline polymer in an embodiment of the present invention. The thermoplastic polyurethane polymer has the Formula (1) below.

(1)

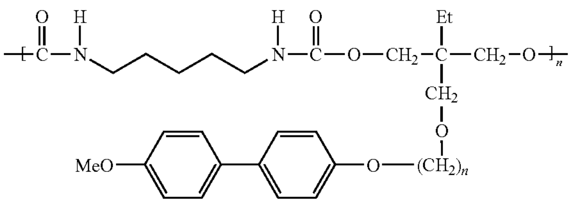

where n is an integer

The liquid conductive polymer used in the present invention combines with side-chain liquid crystals of the side-chain liquid crystalline polymer, thereby improving conductivity. The use of the liquid conductive polymer can effectively solve problems, such as difficulty of dispersing a solid conductive material (e.g., solid state thiophene or carbon black) in a composition for preparing the belt, a nonuniform electrical resistance resulting from the nonuniform dispersion of the conductive material, migration of the conductive material toward a surface of the belt over time, etc.

Examples of the liquid conductive polymer that can be used in the present invention include liquid polythiophene, liquid polyaniline, polypyrrole, and combinations thereof, but the polymers are not limited thereto. In an embodiment of the present invention, the liquid conductive polymer may be polythiophene, which is more miscible with SCLC-TPU (side chain liquid crystalline thermoplastic polyurethane) than other electrically conductive polymers.

The amount of the liquid conductive polymer may be in a range of 2-10% by weight based on the total weight of the semiconductive belt with balance being the weight of the side chain liquid crystalline polymer. When the amount of the liquid conductive polymer is less than 2% by weight, it is difficult to attain electrical conductivity. When the amount of the liquid conductive polymer is greater than 10% by weight, the miscibility with polymer is low, and it is difficult to achieve low resistance.

The semiconductive belt according to the present invention can further include other additives. For example, to allow effective dispersion of the conductive material in an extruder where the conductive material stays for a short time, the semiconductor belt may further include a low-molecular weight wax or oil, etc. The amount of the low-molecular weight wax or oil may be in a range of 3-5% by weight of the total weight of the semiconductive belt.

In an embodiment, the semiconductive belt according to the present invention may be a seamless semiconductive belt rather than a seamed semiconductive belt which has the disadvantages described above.

The semiconductive belt according to the present invention may have a specific gravity of 1.02-1.13 and an intrinsic viscosity of 1.30-1.50 dl/g. However, the specific gravity and the intrinsic viscosity of the semiconductive belt are not limited thereto. The semiconductive belt may have a volume resistance of $10^8$-$10^{14}$ Ωcm.

Since the thickness of the semiconductive belt affects the volume resistance, the thickness of the semiconductive belt should be determined to be within an appropriate range. For example, the thickness of the semiconductive belt may be in a range of 50-600 μm.

Hereinafter, a method of manufacturing the semiconductive belt according to an embodiment of the present invention will be described. The semiconductive belt may be manufactured through a continuous double bubble tubular film process.

A biaxial-oriented, mechanically strong polymer film can be manufactured using a double bubble tubular film process. Unlike a single bubble tubular film process involving forming a low orientation film from a molten composition and cooling the low orientation film, the double bubble tubular film process leads to biaxial chain orientation in a free state in a machine direction (MD) and a transverse direction (TD), and thus a polymer film with greater mechanical strength can be obtained. In addition, the polymer film manufactured through the double bubble tubular film process is thinner than a film manufactured through a conventional tendering process. Furthermore, even when a standard size of an intermediate transfer belt used in a conventional electrophotographic imaging apparatus is varied, an intermediate transfer belt having a particular size can be manufactured by adjusting the size of bubbles in the double bubble tubular film process. Since the double bubble tubular film process is a continuous process, mass-scale production of intermediated transfer belts is possible.

Figure 3:
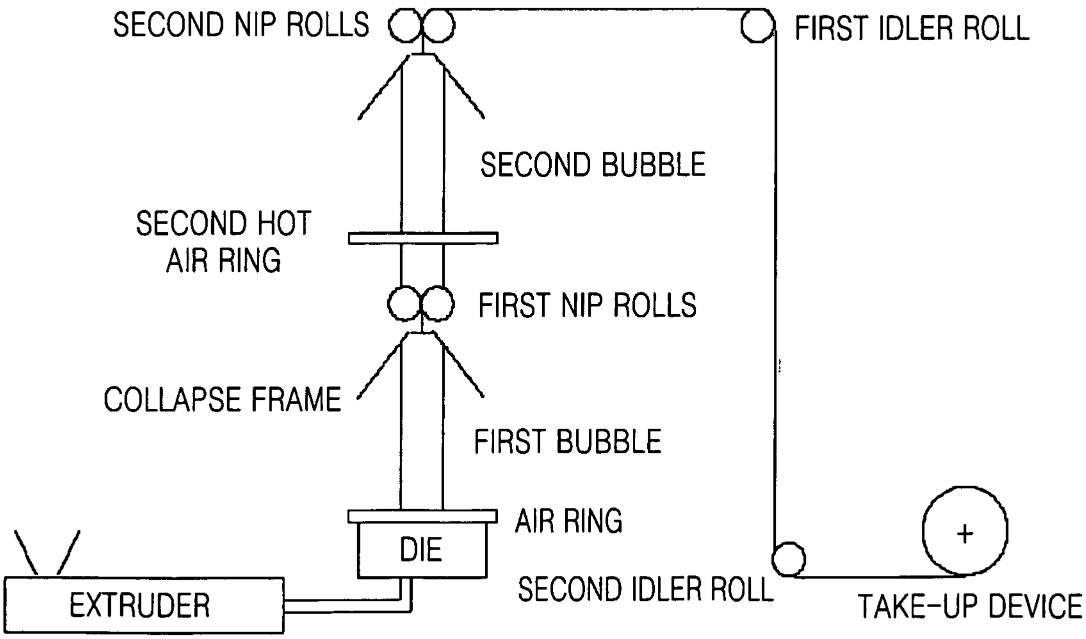
FIG. 3 illustrates a structure of an apparatus used in a double bubble tubular film process according to an embodiment of the present invention.

FIG. 3 illustrates a structure of an apparatus used in the double bubble tubular film process according to the present invention.

Referring to FIG. 3, a mixture of a side-chain liquid crystalline polymer and a liquid conductive polymer is pelletized in an extruder, dried, and passed through the extruder. Next, the pelletized product is passed through a die, an air ring, first bubbles, first nip rolls, a second hot air ring, second bubbles, second nip rolls, and then idler rolls (first and second idler rolls), and then finally recovered in a recovery unit.

In the double bubble tubular film process, a blow-up ratio and a draw-down ratio are important factors affecting the thickness and the mechanical properties of a final semiconductive belt. The blow-up ratio refers to the ratio of bubble diameter to die diameter. The draw-down ratio refers to the ratio of die gap to the product of film thickness and blow-up ratio (film thickness×blow-up ratio).

The air ring in FIG. 3 regulates a constant amount of cooled air. A constant amount of cooled air is required to obtain a final film having a constant thickness. In addition, the formation of wrinkles in the film can be prevented by controlling the nip rolls and collapse frames.

A method of manufacturing a semiconductive belt according to another embodiment of the present invention includes: mixing a side-chain liquid crystalline polymer and a liquid conductive polymer in a nitrogen atmosphere; mixing and pelletizing the mixture in an extruder to obtain pellets; drying the pellets; and injecting the dried pellets into a double bubble tubular injection apparatus to manufacture the semiconductive belt.

The extruder may be a screw extruder with a circular die for forming films and having an inner diameter of 26-29 mm and an outer diameter of 29-32 mm.

In the extruding operation, the extrusion temperature may be in a range of 200-260° C. When the extrusion temperature is lower than 200° C., the molten-viscosity is too high. When the extrusion temperature is higher than 260° C., the molten-viscosity is too low.

In the second bubble process performed in the double bubble tubular injection apparatus, the thickness and mechanical properties of the final semiconductive belt are determined. Thus, the blow-up ratio and the draw-down ratio are very important in the second bubble process. The blow-up ratio may be in a range of 1.24-1.26, and the draw-down ratio may be in a range of 21-23.

For the stability of air bubbles in the second bubble process, a stretching temperature of the second bubble process may be in a range of 65-110° C. When the stretching temperature is lower than 65° C., pin holes may be generated in the film. When the stretching temperature is higher than 110° C., double air bubbles are generated, which is undesirable.

Alternatively, the method of manufacturing the semiconductive belt may further include coating an additive on the final belt, if required, to provide an easy-release property.

In another aspect of the present invention, there is provided an electrophotographic imaging apparatus including the semiconductive belt described above.

The semiconductive belt according to the present invention may be used in an intermediate transfer unit of various electrophotographic imaging apparatuses, and in particular, laser beam printers, LED print head type printers, facsimiles, photocopiers, multifunctional peripherals, etc.

Hereinafter, the present invention will be described in greater detail with reference to the following example. The following example is for illustrative purposes only and is not intended to limit the scope of the invention.

Example

95% by weight of a thermoplastic polyurethane-based side-chain liquid crystalline polymer having a specific gravity of 1.02-1.13 and an intrinsic viscosity (IV) of 1.30-1.50 dl/g and 5% by weight of conductive liquid polythiophene were put into a modular intermeshing co-rotating twin-screw extruder.

Process temperatures in sections between a hopper and an extrusion die were set to 80° C., 180° C., 230° C., 230° C., 230° C., and 200° C., respectively. Screws for blending were used, and the screw rate in the extruder was set to 150 rpm. The mixture of the thermoplastic polyurethane-based side-chain liquid crystalline polymer and the conductive liquid polythiophene was extruded in a nitrogen atmosphere and then pelletized.

The extruded pellets were vacuum-dried at 50° C. in a drier for a day and passed between a pair of annular screw extruders each having an inner diameter of 26-29 mm and an outer diameter of 29-32 mm to obtain a semiconductive film having a thickness of 130 μm and a volume resistance of $10^8$-$10^9$ Ωm. The semiconductive film was processed into a seamless film belt having an outer circumference of 150 mm and a width of 232 mm to be used for a seamless intermediate transfer belt.

The extrusion temperature of the semiconductive film was in a range of 200-260° C., and a stretching temperature was adjusted in a range of 65-110° C. to ensure the stability of air bubbles in a second bubble process. The draw-down ratio in the second bubble process was adjusted to 1.5 or less to increase the stability of bubbles in hot air stream, and the blow-up ratio in the second bubble process was adjusted to 2.5 or greater to enhance the stability of the film at the low stretching temperature.

Figure 2:
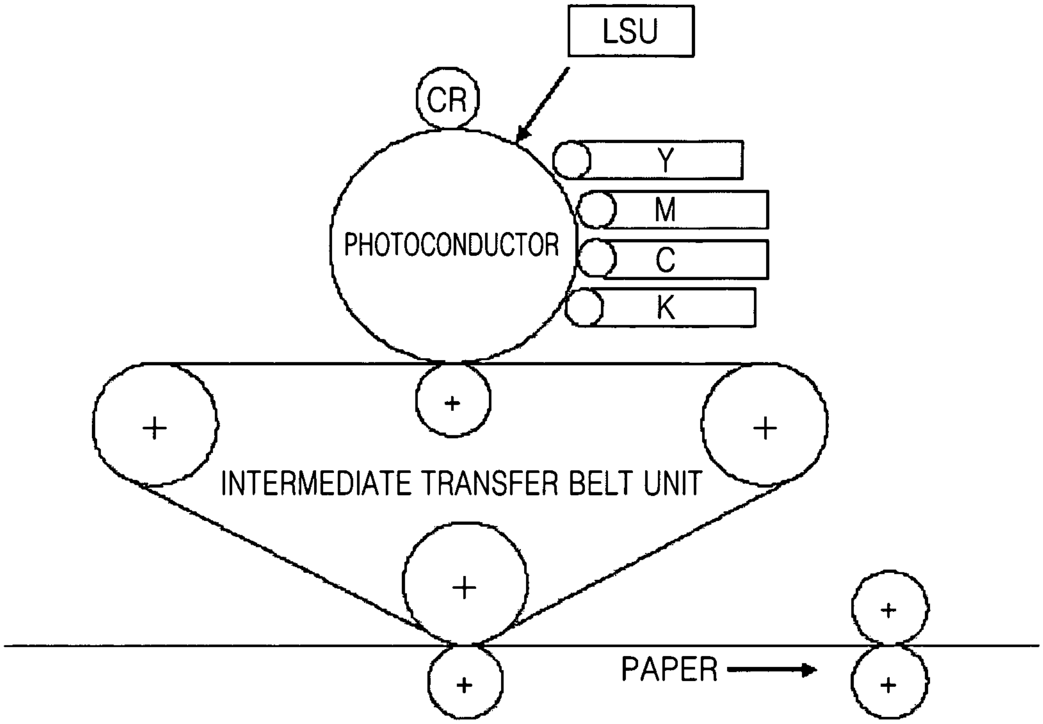
FIG. 2 is a cross-sectional view showing an intermediate transfer belt unit of a conventional electrophotographic imaging apparatus.

The seamless film belt obtained through cutting had a width of 232 mm, an outer circumference of 150 mm and a thickness of 130 μm. Next, a urethane guide rail having a thickness of 1.5 mm and a width of 4 mm was attached to the seamless film belt to obtain a semiconductive belt, which was installed as an intermediate transfer belt in the intermediate transfer belt unit in FIG. 2. The semiconductive belt had the following physical properties:

Volume Resistance (Ωm): $1.0\times10^{8}$-$1.0\times10^{14}$

Elongation (%): 6-8

Yield Strength (kg/cm$^2$): 500-600

Surface Roughness (Rz): <1.0

Considering the measured physical properties, the semiconductive belt according to the present invention is suitable to be used as an intermediate transfer belt. In addition, the surface roughness of the semiconductive belt is smaller and the abrasion resistance thereof is greater than a conventional polycarbonate-based semiconductive belt.

The semiconductive belt according to the present invention has the following advantages.

First, the lifespan of the semiconductive belt is extended due to the increased abrasion resistance. Second, due to the function of side-chain liquid crystals of the thermoplastic polyurethane-base polymer, the liquid conductive polymer leads to a stable resistance. Third, since a continuous double bubble tubular film process is used instead of a conventional single bubble film extrusion or film casting method, the mechanical strength of the film is increased, and the film has a uniform electrical conductivity because the double bubble tubular film process allows easy dispersion of a conductive additive. Fourth, the cost for purchasing a number of molds in a conventional centrifugal molding method, which further increases when there is a need to purchase new standard-size molds, is saved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductive belt obtained from a polymer composition comprising:

a side-chain liquid crystalline polymer comprising a base polymer having a pendent liquid crystalline polymer side chain; and a liquid conductive polymer.

2. The semiconductive belt of claim 1, wherein the base polymer is selected from the group consisting of a thermoplastic polyurethane polymer, a polystyrene polymer, a polyamide polymer, a methacrylate polymer, a siloxane polymer, and mixtures thereof.

3. The semiconductive belt of claim 2, wherein the side-chain liquid crystal polymer is a thermoplastic polyurethane polymer of Formula (1) below:

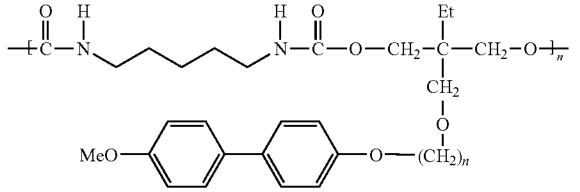

where n is an integer.

4. The semiconductive belt of claim 1, wherein the liquid conductive polymer is selected from the group consisting of liquid polythiophene, liquid polyaniline, polypyrrole, and mixtures thereof.

5. The semiconductive belt of claim 4, wherein the liquid conductive polymer is liquid polythiophene.

6. The semiconductive belt of claim 1, wherein the amount of the liquid conductive polymer is in a range of 2-10% by weight based on the total weight of the semiconductive belt.

7. The semiconductive belt of claim 1, further comprising 3-5% by weight of a low-molecular weight wax or oil based on the total weight of the composition of the semiconductive belt.

8. The semiconductive belt of claim 1, wherein the semiconductive belt is a seamless semiconductive belt.

9. The semiconductive belt of claim 1, wherein the semiconductive belt has a specific gravity of 1.02-1.13 and an intrinsic viscosity of 1.30-1.50 dl/g.

10. The semiconductive belt of claim 1, wherein the semiconductive belt has a volume resistance of $10^{8}$-$10^{14}$ Ωcm.

11. The semiconductive belt of claim 1, wherein the semiconductive belt has a thickness of 50-600 μm.

12. The semiconductive belt of claim 1, wherein the semiconductive belt is formed from a double bubble tubular film process.

13. An electrophotographic imaging apparatus comprising the semiconductive belt of claim 1.

14. A semiconductive belt obtained from a polymer composition comprising:

a side-chain liquid crystalline polymer; and a liquid conductive polymer, wherein the side-chain liquid crystalline polymer is a thermoplastic polyurethane polymer of Formula (1) below:

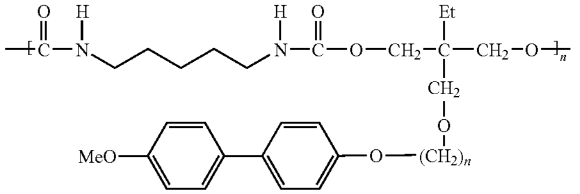

where n is an integer, wherein the liquid conductive polymer is liquid polythiophene.

* * * * *

UNITED STATES PATENT AND TRADEMARK OFFICE

CERTIFICATE OF CORRECTION

PATENT NO. : 7,638,183 B2
APPLICATION NO. : 11/449760
DATED : December 29, 2009
INVENTOR(S) : In Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Ninth Day of November, 2010

David J. Kappos

*Director of the United States Patent and Trademark Office*